(12) United States Patent
Noguchi et al.

(10) Patent No.: US 7,026,070 B2
(45) Date of Patent: Apr. 11, 2006

(54) POSITIVE ELECTRODE ACTIVE MATERIAL, POSITIVE ELECTRODE AND NON-AQUEOUS ELECTROLYTE SECONDARY BATTERY USING THEREOF

(75) Inventors: Takehiro Noguchi, Tokyo (JP); Tatsuji Numata, Tokyo (JP)

(73) Assignee: NEC Corporation, Tokyo (JP)

( * ) Notice: Subject to any disclaimer, the term of this patent is extended or adjusted under 35 U.S.C. 154(b) by 535 days.

(21) Appl. No.: 10/270,946

(22) Filed: Oct. 15, 2002

(65) Prior Publication Data

US 2003/0086863 A1 May 8, 2003

(30) Foreign Application Priority Data

Oct. 18, 2001 (JP) ............................. 2001-320675

(51) Int. Cl.
*H01M 4/58* (2006.01)

(52) U.S. Cl. ............................... 429/231.5; 429/231.95

(58) Field of Classification Search ........... 429/231.95, 429/231.5

See application file for complete search history.

(56) References Cited

U.S. PATENT DOCUMENTS 6,432,581 B1 * 8/2002 Amatucci et al. ........... 429/224

FOREIGN PATENT DOCUMENTS

| JP | 9-147867 | 6/1997 |
|---|---|---|
| JP | 2000-235857 | 8/2000 |
| JP | 2001-110421 | 4/2001 |
| JP | 2001-176557 | 6/2001 |
| JP | 2002-063900 | 2/2002 |

OTHER PUBLICATIONS

Korean Office Action dated Sep. 20, 2004.

* cited by examiner

*Primary Examiner*—Bruce F. Bell
(74) *Attorney, Agent, or Firm*—Katten Muchin Roseman LLP

(57) ABSTRACT

A positive electrode active material for a secondary battery contains a spinel lithium manganese composite oxide expressed by a general formula of $Li_a(M_xMn_{2-x-y}A_y)O_4$ where x and y are positive values which satisfy $0.4<x$, $0<y$, $x+y<2$, and $0<a<1.2$. "M" denotes Ni and at least one metal element selected from the group consisting of Co, Fe, Cr and Cu. "A" denotes at least one metal element selected from the group consisting of Si and Ti. The ratio y of A has a value of $0.1<y$ in case where A includes only Ti. Accordingly, it is possible to acquire a material for the positive electrode of a lithium ion secondary battery, which has a high capacity and a high energy density with a high voltage of 4.5 V or higher with respect to Li.

14 Claims, 2 Drawing Sheets

F I G. 2
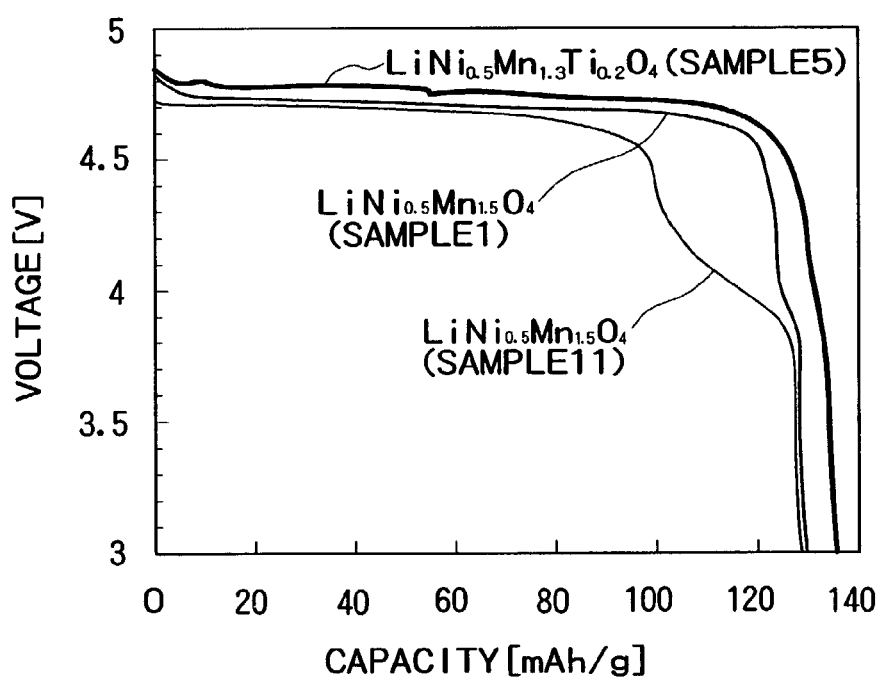

POSITIVE ELECTRODE ACTIVE MATERIAL, POSITIVE ELECTRODE AND NON-AQUEOUS ELECTROLYTE SECONDARY BATTERY USING THEREOF

BACKGROUND OF THE PRESENT INVENTION

1. Field of the Present Invention

The present invention relates to a positive electrode active material and a non-aqueous electrolyte lithium ion secondary battery using thereof. More particularly, the present invention relates to an active material for the positive electrode of a non-aqueous electrolyte lithium ion secondary battery, which is comprised of a spinel lithium manganese composite oxide having a large discharge capacity and a secondary battery using that material.

2. Description of the Related Art

A lithium secondary battery and a lithium ion secondary battery (hereinafter called "lithium based secondary battery") are characterized by having a large capacity for its small size, and are widely used as a power supply for cell telephones, notebook type personal computers and so forth. While $LiCoO_2$ is mainly used as an active material for a positive electrode (hereinafter referred to as "positive active material") of a lithium based secondary battery at present, safety in its charge state is not particularly sufficient and the price for the Co material is high. In this respect, active studies are being made on new positive active materials which replace $LiCoO_2$.

Consideration is being made on the use of $LiNiO_2$ as the material which has a layer-like crystal structure similar to that of $LiCoO_2$. $LiNiO_2$, which demonstrates a high capacity, has a lower potential than $LiCoO_2$ and still has a problem on safety in charging.

Active studies are also being made on the use of $LiMn_2O_4$ with a spinel structure as another positive active material. However, $LiMn_2O_4$ suffers cycle-dependent degradation and a reduction in capacity at high temperature. Those appear to be originated from the instability of trivalent Mn and the cycle-dependent deterioration of the performance or the like seems to occur because Jahn-Teller distortion occurs in the crystal at the time the mean valence number of Mn ions changes between trivalence and tetravalence.

In view of the above, studies have been made to improve the structural stability by replacing trivalent Mn with other elements in order to enhance the reliability of the battery. For example, Japanese Patent Laid-Open No. 2001-176557 discloses a secondary battery having such a positive active material and discloses an active material in which trivalent Mn included in $LiMn_2O_4$ is replaced with other metals. Specifically, the claims in the publication describe a secondary battery having a lithium manganese composite oxide, which has a spinel structure and is expressed by a composition formula of $LiM_xMn_{2-x}O_4$ (where M represents one or more types of elements selected from Al, B, Cr, Co, Ni, Ti, Fe, Mg, Ba, Zn, Ge and Nb and $0.01 \leq x \leq 1$). The detailed description of the present invention in the publication specifically discloses an example which uses $LiMn_{1.75}Al_{0.25}O_4$ as a positive active material.

In case where trivalent Mn is reduced by substitution of another element as mentioned above, however, a reduction in discharge capacity should be coped with. As charge and discharge take place, the valence number of Mn in $LiMn_2O_4$ changes as follows.

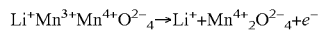

As apparent from this formula, $LiMn_2O_4$ contains trivalent Mn and tetravalent Mn and brings about discharging as the trivalent Mn is changed to tetravalent Mn. Substituting another element for the trivalent Mn, therefore, inevitably decreases the discharge capacity. That is, while the reliability of the battery is improved by increasing the structural stability of the positive active material, a reduction in discharge capacity becomes prominent. It is therefore difficult to satisfy both. Particularly, it is extremely difficult to acquire a highly-reliable positive active material with a discharge capacity of 130 mAh/g or greater.

As apparent from the above, an active material in which trivalent Mn included in $LiMn_2O_4$ is replaced with another metal constitutes a lithium secondary battery having so-called 4-V class electromotive force. Techniques in different aspects have also been studied. In Japanese Patent Laid-Open No. 147867/1997, for example, Ni, Co, Fe, Cu, Cr or the like is substituted for part of Mn in $LiMn_2O_4$ to increase the charge/discharge potential, thereby increasing the energy density. Those techniques construct a lithium secondary battery having so-called 5-V class electromotive force. A description of this type of lithium secondary battery will be given below of a specific example of $LiNi_{0.5}Mn_{1.5}O_4$.

$LiNi_{0.5}Mn_{1.5}O_4$ changes the valence number of Ni in accordance with charging and discharging.

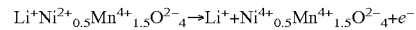

As apparent from this formula, $LiNi_{0.5}Mn_{1.5}O_4$ causes discharging as bivalent Ni changes to tetravalent Ni. Mn does not change its valence number. Electromotive force of 4.5 V or greater can apparently be acquired by changing metal associated with charging and discharging to Ni or Co or the like from Mn.

Japanese Patent Laid-Open No. 2000-235857 discloses a crystal $LiMn_{2-y-z}Ni_yM_zO_4$ (where M denotes at least one selected from the group consisting of Fe, Co, Ti, V, Mg, Zn, Ga, Nb, Mo and Cu, $0.25 \leq y \leq 0.6$ and $0 \leq z \leq 0.1$) with a spinel structure, which performs charging and discharging with respect to Li at a potential of 4.5 V or higher. Japanese Patent Laid-Open No. 2002-63900 discloses a 5-V class positive active material in which Mn in $LiMn_2O_4$ is replaced with another transition metal and is further replaced with other elements and which is expressed by a general formula $Li_aMn_{2-y-i-j-k}M_yM1_iM2_jM3_kO_4$ (where M1 is a bivalent cation, M2 is a trivalent cation, M3 is a tetravalent cation, M is an at least one type of transition metal element excluding Mn, $i \geq 0$, $j \geq 0$, $k \geq 0$ and $i+j>0$).

Even the use of such an active material however still makes it difficult, at present, to significantly surpass $LiCoO_2$, currently available, in energy density. While the 5-V class active materials can indeed generate electromotive force of 4.5 V or greater, however, they have a problem that the discharge capacity is reduced.

SUMMARY OF THE PRESENT INVENTION

Accordingly, it is an object of the present invention to provide a positive electrode active material for a secondary battery, a positive electrode for a secondary battery and a non-aqueous electrolyte secondary battery, all of which have a high capacity and a high energy density.

A positive electrode active material for a secondary battery according to the present invention contains a spinel lithium manganese composite oxide expressed by the following general formula 1.

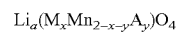          (1)

where x, y and z are positive values which satisfy $0.4<x$, $0<y$, $x+y<2$, and $0<a<1.2$, the ratio y of A has a value of $0.1<y$ in case where A includes only Ti, M denotes at least one metal element including Ni, and A denotes at least one metal element selected from the group consisting of Si and Ti.

A positive electrode for a secondary battery according to the present invention has the positive active material for a secondary battery bound by a binder.

A secondary battery according to the present invention comprises the positive electrode for a secondary battery, and a negative electrode so arranged as to be opposite to the positive electrode via a separator.

As indicated by the formula 1, one of the features of the present invention lies in containing a transition metal M which can take both states of a valence number equal to or smaller than trivalence and a valence number greater than trivalence and containing Si or Ti (element A) which has a lighter weight than Mn.

The present invention increases the capacity of the battery and the energy density by substitution of an element in a spinel positive electrode material. By substituting at least one type selected from Ni, Co, Fe, Cr and Cu for part of Mn in $LiMn_2O_4$, the charge/discharge areas of a high voltage which are originated from a change in the valence number of the substituted element appear according to the amount of substitution. To acquire sufficiently large charge/discharge areas of a high voltage, $x>0.4$ is required in case of $LiM_xMn_{2-x}O_4$. In case of $LiNi_{0.5}Mn_{1.5}O_4$ which is one of 5-V class spinels, Mn is tetravalent and the valence number of Ni, not Mn, as the transition metal, changes (from bivalent to tetravalent) in the process of doping and undoping of Li originated from discharging/charging so that Mn is kept tetravalent. In the 5-V class spinel, $Mn^{3+}$ does not exist idealistically so that even if Mn is replaced with another element, reduction in reliability, such as the cycle-oriented reduction in capacity and the deterioration of the crystal structure at high temperature, hardly occurs. In view of those points, the present invention increases the capacity by increasing the discharge amount per weight by replacing Mn, which does not directly contribute to charging and discharging, with a lighter metal.

In case where an element with a small valence number, such as bivalence or trivalence, is substituted for the Mn site in $LiNi_{0.5}Mn_{1.5}O_4$, the balance of the valence number is maintained as bivalent Ni becomes trivalent Ni or remaining trivalent Mn becomes tetravalent Mn. As a result, the amount of bivalent Ni or the amount of trivalent Mn, which contributes to charging and discharging is reduced, thereby making the capacity smaller. In this respect, it is also desirable that the substituted element be tetravalent.

Although a technique of replacing Mn with another element is employed in the aforementioned 4-V class active materials, it is intended to improve the stability of the structures of the positive active materials, whereas the present invention uses such a technique to increase the capacity. With attention paid to the specific structure, trivalent Mn which is associated with charging and discharging in a 4-V class active material is replaced in the related art, whereas in the present invention, the positive active material contains a transition metal M which can take both states of a valence number equal to or smaller than trivalence and a valence number greater than trivalence. As a result, the main metal that is associated with charging and discharging is a metal other than Mn. The present invention differs from the related art in those points. In the present invention, most of Mn becomes tetravalent because of the presence of the element M, and trivalent Mn that is associated with charging and discharging is hardly contained.

As described above, in addition to the use of the element M which results in that Mn is basically disassociated with charging and discharging, Mn is replaced with a lighter metal to increase the discharge amount per weight, thereby ensuring a higher capacity. Stable tetravalent elements which are lighter than Mn include Si and Ti. That is, substituting Si or Ti for Mn can ensure a higher capacity while maintaining a high reliability.

The larger the amount of element substitution, the greater the effect of the capacity increasing by substitution of Si or Ti. For $Li_a(M_xMn_{2-x-y}A_y)O_4$, when $y>0.1$, the effect is particularly prominent, a capacity of 130 mAh/g or higher is obtained and the reliability is high. In the case of 5-V class spinel, substitution of Si or Ti can provide a higher capacity and ensure charging and discharging with a high voltage of 4.5 V or higher with respect to the metal Li. The present invention can therefore provide excellent characteristics in terms of the energy density. In case of Ti substitution, it was newly found that the discharge potential could be set high. Those two effects can ensure a high energy density.

BRIEF DESCRIPTION OF THE DRAWINGS

FIG. 2 shows discharge curves for positive electrodes which use positive electrode active materials of the present invention.

DETAILED DESCRIPTION OF THE PREFERRED EMBODIMENT

Figure 1:
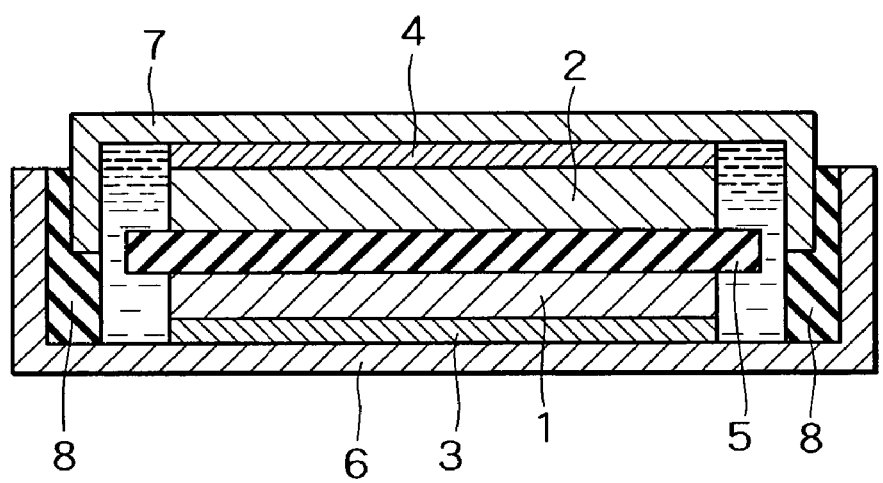
FIG. 1 is a diagram illustrating the cross-sectional structure of a secondary battery according to the present invention.

Although the element M in the general formula 1 includes Ni as an essential component, M may further include one element selected from a group consisting of Co, Fe, Cr and Cu. Any of those metals is a transition metal which can take both states of a valence number equal to or smaller than trivalence and a valence number greater than trivalence. $LiM_xMn_{2-x}O_4$ (M being at least one of Ni, Co, Fe, Cr and Cu) in which Ni, Co, Fe, Cr or Cu is substituted for part of Mn in $LiMn_2O_4$ is known as a 5-V class manganese spinel type positive active material. Some of the reasons for selecting Ni as the essential component as in the present invention are that Ni is an inexpensive material and has a large discharge capacity as the active material for a battery. While the 5-V class manganese spinel containing Co, Fe, Cr or Cu is advantageous over a Ni-containing 5-V class manganese spinel in that the charge/discharge voltage of the battery is high, it has a shortcoming that the discharge capacity is small. As Ni is contained as the essential element as in the present invention, the conventional low capacity characteristic of the battery that uses a 5-V class manganese spinel containing Co, Fe, Cr or Cu can be improved. Further, this spinel can provide higher electromotive force than the 5-V class manganese spinel which contains Ni alone. The element M may include another element as a minute amount of a component. Further, the element M may be Ni alone.

The composition ratio x of the element M can be set to $0.4<x<0.6$. In case where M is comprised of Ni alone, particularly, it is preferable that x should take the range. This range can ensure higher electromotive force and higher capacity.

The positive active material according to the present invention can take such a structure that the mean discharge voltage with respect to the lithium reference potential is 4.5 V or higher. This structure can realize a battery with a high operational voltage. For example, the potential of Ni is 4.7 V, the potential of Co is 5.1 V and the potential of Cr is 5.0 V with respect to the lithium reference potential, so that the use of those metals as the component that contributes to charging and discharging can provide the aforementioned positive active material which has a mean discharge voltage of 4.5 V or higher with respect to the lithium reference potential.

"A" in the general formula 1 in the present invention can take a structure containing Si. Further "A" can take a structure containing Ti.

The spinel lithium manganese composite oxide in the present invention can take any of structures respectively expressed by the following formulae 1a to 1c.

$$Li_a(Ni_xMn_{2-x-y}Si_y)O_4 \quad (1a)$$

where $0.4<x<0.6$, $0<y$, $x+y<2$, and $0<a<1.2$.

$$Li_a(Ni_xMn_{2-x-y}Ti_y)O_4 \quad (1b)$$

where $0.4<x<0.6$, $0.1<y$, $x+y<2$, and $0<a<1.2$.

$$Li_a(Ni_xMn_{2-x-y-z}Si_yTi_z)O_4 \quad (1c)$$

where $0.4<x<0.6$, $0<y$, $0<z$, $x+y+z<2$, and $0<a<1.2$.

In the present invention, it is also possible to take a structure in which part of oxygen in the formula 1 or any of the formulae 1a to 1c is replaced with halogen, such a F or Cl.

A method of preparing the positive active material according to the present invention will be described below. While $Li_2CO_3$, $LiOH$, $Li_2O$, $Li_2SO_4$ and the like can be used for the Li raw material as the source material for the positive active material, particularly, $Li_2CO_3$ and $LiOH$ among them are suitable. Various Mn oxides, such as electrolytic manganese dioxide (EMD), $MnCO_3$ and $MnSO_4$, $MnCO_3$, $MnSO_4$, etc. can be used as the Mn raw material. NiO, $Ni(OH)_2$, $NiSO_4$, $Ni(NO_3)_2$ and the like can be used as the Ni raw material. $TiO_2$ or the like can be used as the Ti raw material, and $SiO_2$, $SiO$, etc. can be used as the Si raw material.

Those raw materials are weighted and mixed in such a way as to have intended metal composition ratios. The raw materials are pulverized by a ball mill, a jet mill or the like. A positive active material is acquired by baking the mixed powder in the air or oxygen at a temperature of 600° C. to 950° C. While the desirable baking temperature is high in order to diffuse the individual elements, the baking temperature, if too high, may bring about oxygen deficiency, which would adversely influence the battery characteristics. In view of this point, it is desirable that the baking temperature should range from about 600° C. to 850° C.

The specific surface area of the acquired lithium metal composite oxide is set to, for example, 3 m²/g or smaller, preferably 1 m²/g or smaller. This is because the greater the specific surface area, the larger the amount of the binder is required, which is disadvantageous in the capacity density of the positive electrode.

In preparing the positive electrode for a secondary battery, the acquired positive active material is mixed with a conductivity giving agent and is then formed on a collector by a binder. Examples of available conductivity giving agents are a metal, such as Al, and powder of a conductive oxide, in addition to a carbon material. Polyvinylidene fluoride or the like is used as the binder. A thin metal film essentially consisting of Al or the like is used as the collector.

The amount of the conductivity giving agent added can be set to, for example, about 1 to 10% by mass, and the amount of the binder added can also be set to about 1 to 10% by mass. The greater the ratio of the weight of the active material, the larger the capacity per weight becomes. If the ratio of the conductivity giving agent to the binder is too small, there may arise problems that the conductivity cannot be maintained and the electrode may be separated.

The secondary battery according to the present invention has a structure, for example, as shown in FIG. 1. A positive active material layer 1 is formed on a positive collector 3, thereby constructing a positive electrode. A negative active material layer 2 is formed on a negative collector 4, thereby constructing a negative electrode. Those positive electrode and negative electrode are so arranged to face each other via a porous separator 5 immersed in the electrolytic solution. A positive outer can 6 which retains the positive electrode and a negative outer can 7 which retains the negative electrode are connected via an insulating packing portion 8.

As a voltage is applied to the positive electrode and the negative electrode, lithium ions are desorbed from the positive active material and are occluded in the negative active material, rendering the secondary battery in a charge state. By causing electric contact between the positive electrode and the negative electrode outside the battery, lithium ions are discharged from the negative active material and are occluded in the positive active material, the actions taken in the reverse direction to the direction in the charging case, thereby rendering the secondary battery in a discharge state.

One type of or a mixture of at least two types of aprotic organic solvents, such as a cyclic carbonate, such as propylene carbonate (PC), ethylene carbonate (EC), butylene carbonate (BC) or vinylene carbonate (VC), a chain carbonate, such as dimethyl carbonate (DMC), diethyl carbonate (DEC), ethylmethyl carbonate (EMC) or dipropyl carbonate (DPC), an aliphatic carboxylate, such as methyl formate, methyl acetate or ethyl propionate, γ-lactone, such as γ-butyrolactone, a chain ether, such as ethoxy ethane (DEE) or ethoxy methoxy ethane (EME), a cyclic ether, such as tetrahydrofuran or 2-methyl tetrahydrofuran, dimethyl sulfoxide, 1,3-dioxolane, formamide, acetamide, dimethyl formamide, dioxolane, acetonitrile, propylnitrile, nitromethane, ethyl monoglyme, triesterphosphate, trimetoxy methane, dioxolane derivative, sulfolane, methylsulfolane, 1,3-dimethyl-2-imidazolidinone, 3-methyl-2-oxazolidinone, propylene carbonate derivative, tetrahydrofuran derivative, ethyl ether, 1,3-propane sultone, anisole, N-methyl pyrolidone and fluorinated carboxylate, is used as the electrolytic solution which is used in the secondary battery according to the present invention, and a lithium salt is dissolved in those organic solvents. Available lithium salts are, for example, $LiPF_6$, $LiAsF_6$, $LiAlCl_4$, $LClO_4$, $LiBF_4$, $LiSbF_6$, $LiCF_3SO_3$, $LiC_4F_9CO_3$, $LiC(CF_3SO_2)_2$, $LiN(CF_3SO_2)_2$, $LiN(C_2F_5SO_2)_2$, $LiB_{10}Cl_{10}$, lower aliphatic carboxylic lithium, chloroborane lithium, lithium 4-phenyl borate, LiBr, LiI, LiSCN, LiCl and imides. A polymer electrolyte may be used in place of the electrolytic solution.

As the electrolyte, $LiBF_4$, $LiPF_6$, $LiClO_4$, $LiAsF_6$, $LiSbF_6$, $LiCF_3SO_3$, $Li(CF_3SO_2)N$, $LiC_4F_9SO_3$, $Li(CF_3SO_2)_3C$, $Li(C_2F_5SO_2)_2N$ and the like can be used singularly or in mixture. The concentration of the electrolyte can be set to, for example, 0.5 mol/liter to 1.5 mol/liter. If the concentration is too high, the density and viscosity may increase, while if the concentration is too low, the electric conductivity may fall.

A material which can occlude and emit lithium ions is used as the negative active material, and may be a single one or a mixture of a carbon material, such as graphite or amorphous carbon, Li, Si, Sn, Al, SiO and SnO.

The negative active material is formed on a collector by a conductivity giving agent and a binder. Examples of the conductivity giving agent are a metal, such as Al, and powder of a conductive oxide, besides a carbon material. Polyvinylidene fluoride or the like is used as the binder. A thin metal film essentially consisting of Al, Cu or the like is used as the collector.

The prepared positive electrode and negative electrode are so arranged as to face each other without electric contact with a separator therebetween. A microporous film of polyethylene, polypropylene or the like can be used as the separator.

The positive electrode and negative electrode so arranged as to face each with the separator sandwiched therebetween are formed cylindrical or in lamination. They are retained in the battery case and are immersed in the electrolytic solution in such a way that both the positive active material and negative active material contact the electrolytic solution. Electrode terminals which keep electric contact with the positive electrode and the negative electrode respectively are connected to the respective positive electrode and negative electrode in such a way that the electrode terminals are led out of the electrode cases, and the battery case is sealed airtight, which completes the secondary battery.

The shape of the secondary battery of the present invention is not restrictive, but the positive electrode and negative electrode so arranged as to face each with the separator sandwiched therebetween can take other forms, such as a wrap-around type and a lamination type, and the cell in use may be a coin type cell, a laminated pack cell, a square type cell or a cylindrical cell.

EXAMPLE 1

The following samples were prepared as the positive active material and evaluated.
Sample 1: $LiNi_{0.5}Mn_{1.5}O_4$
Sample 2: $LiNi_{0.5}Mn_{1.45}Ti_{0.05}O_4$
Sample 3: $LiNi_{0.5}Mn_{1.4}Ti_{0.1}O_4$
Sample 4: $LiNi_{0.5}Mn_{1.35}Ti_{0.15}O_4$
Sample 5: $LiNi_{0.5}Mn_{1.3}Ti_{0.2}O_4$
Sample 6: $LiNi_{0.5}Mn_{1.2}Ti_{0.3}O_4$
Sample 7: $LiNi_{0.5}Mn_{1.3}Si_{0.2}O_4$
Sample 8: $LiNi_{0.5}Mn_{1.1}Si_{0.4}O_4$
Sample 9: $LiNi_{0.5}Mn_{1.1}Ti_{0.3}Si_{0.1}O_4$
Sample 10: $LiNi_{0.5}Mn_{1.35}Ti_{0.05}Si_{0.1}O_4$
Sample 11: $LiNi_{0.5}Mn_{1.5}O_4$
Sample 12: $LiNi_{0.4}Co_{0.2}Mn_{1.4}O_4$
Sample 13: $LiNi_{0.4}Co_{0.2}Ti_{0.15}Mn_{1.25}O_4$
Sample 14: $LiNi_{0.3}Co_{0.4}Mn_{1.3}O_4$
Sample 15: $LiNi_{0.3}Co_{0.4}Ti_{0.15}Mn_{1.15}O_4$
Sample 16: $LiNi_{0.4}Fe_{0.2}Mn_{1.4}O_4$
Sample 17: $LiNi_{0.4}Fe_{0.2}Ti_{0.15}Mn_{1.25}O_4$
Sample 18: $LiNi_{0.4}Cr_{0.2}Mn_{1.4}O_4$
Sample 19: $LiNi_{0.4}Cr_{0.2}Si_{0.05}Mn_{1.35}O_4$
Sample 20: $LiNi_{0.45}Cu_{0.05}Mn_{1.5}O_4$
Sample 21: $LiNi_{0.45}Cr_{0.05}Si_{0.05}Mn_{1.45}O_4$ Preparation of the Positive Active Material A composite oxide was used for the raw materials excluding Li in samples 1 to 10 and samples 12 to 21. For only sample 11, $MnO_2$ and NiO were weighted in such a way as to have intended metal composition ratios and then pulverized and mixed with $Li_2CO_3$ as the Li raw material. The powder after mixing the raw materials were baked for eight hours at a temperature of 750° C. It was confirmed that the crystal structures of samples 1 to 10 and samples 12 to 21 were approximately single-phase spinel structures. For sample 11, a slight NiO-based different phase was detected.

Each prepared positive active material was mixed with carbon as the conductivity giving agent and was then dispersed in N-methyl pyrolidone, with polyvinylidene fluoride dissolved therein, in the form of a slurry. The weight ratios of the positive active material, the conductivity giving agent and the binder were 88/6/6. The slurry was coated on the Al collector, after which the resultant structure was dried in vacuum for twelve hours to yield the electrode material. The electrode material was cut out into a disc of 12 mm in diameter. Thereafter, the electrode material was pressure-molded under pressure of 3 t/cm². An Li disc was used for the negative electrode.

With a PP film used as the separator, the positive electrode and the negative electrode were so arranged to face each other and are placed in a coin cell which was filled with an electrolytic solution and sealed airtight. The electrolytic solution in use was 1 mol/liter of an electrolyte $LiPF_6$ dissolved in a solvent EC (ethylene carbonate)/DEC (diethyl carbonate)=3/7 (vol-%).

For samples 1 to 11, the evaluation of the battery characteristics was conducted while charging was performed up to 4.9 V at a charge rate of 0.1 C and discharging was performed up to 3 V at a discharge rate of 0.1 C. For samples 12 to 21, charging was performed up to 5.1 V at a charge rate of 0.1 C and discharging was performed up to 3 V at a rate of 0.1 C. Table 1 below shows the results of measuring the capacity and the mean operational voltage. It was confirmed that the capacity was increased in both cases of Ti substitution and Si substitution.

FIG. 2 shows the discharge curves of $LiNi_{0.5}Mn_{1.3}Ti_{0.2}O_4$ (sample 5), $LiNi_{0.5}Mn_{1.5}O_4$ (sample 1) and $LiNi_{0.5}Mn_{1.5}O_4$ (sample 11).

In the case of Ti substitution, there was a tendency of an increase in the potential of the discharge plateau in an area near 4.7 V as the capacity increased. This seems to have occurred due to an increase in the discharge potential that was resulted from a change in the state of the Ni electrons. In the case of Ti substitution, it was found that a higher energy density would be provided by the two effects of achieving a large capacity and a high voltage. Sample 1 in which composite oxides of Mn and Ni were used for the raw materials of Mn and Ni had a larger capacity than sample 11. Particularly, the 5-V discharge area was increased in sample 1. This seems to have occurred because Mn, Ni, Li, etc. in the spinel was diffused more uniformly, yielding an active material with a high crystallinity, in sample 1 than in sample 11.

TABLE 1

| Samples | Composition formulae | Capacity (mAh/g) | Mean Operational voltage (V) | Weight energy density of positive electrode (mWh/g) |
|---|---|---|---|---|
| Sample 1 | $LiNi_{0.5}Mn_{1.5}O_4$ | 133 | 4.63 | 616 |
| Sample 2 | $LiNi_{0.5}Mn_{1.45}Ti_{0.05}O_4$ | 133 | 4.64 | 617 |
| Sample 3 | $LiNi_{0.5}Mn_{1.4}Ti_{0.1}O_4$ | 134 | 4.65 | 623 |
| Sample 4 | $LiNi_{0.5}Mn_{1.35}Ti_{0.15}O_4$ | 137 | 4.67 | 640 |
| Sample 5 | $LiNi_{0.5}Mn_{1.3}Ti_{0.2}O_4$ | 138 | 4.68 | 646 |

TABLE 1-continued

| Samples | Composition formulae | Capacity (mAh/g) | Mean Operational voltage (V) | Weight energy density of positive electrode (mWh/g) |
|---|---|---|---|---|
| Sample 6 | $LiNi_{0.5}Mn_{1.2}Ti_{0.3}O_4$ | 134 | 4.65 | 623 |
| Sample 7 | $LiNi_{0.5}Mn_{1.3}Si_{0.2}O_4$ | 135 | 4.63 | 625 |
| Sample 8 | $LiNi_{0.5}Mn_{1.1}Si_{0.4}O_4$ | 125 | 4.62 | 578 |
| Sample 9 | $LiNi_{0.5}Mn_{1.1}Ti_{0.3}Si_{0.1}O_4$ | 136 | 4.65 | 632 |
| Sample 10 | $LiNi_{0.5}Mn_{1.35}Ti_{0.05}Si_{0.1}O_4$ | 136 | 4.66 | 634 |
| Sample 11 | $LiNi_{0.5}Mn_{1.5}O_4$ | 130 | 4.6 | 598 |
| Sample 12 | $LiNi_{0.4}Co_{0.2}Mn_{1.4}O_4$ | 125 | 4.69 | 586 |
| Sample 13 | $LiNi_{0.4}Co_{0.2}Ti_{0.15}Mn_{1.25}O_4$ | 131 | 4.74 | 621 |
| Sample 14 | $LiNi_{0.3}Co_{0.4}Mn_{1.3}O_4$ | 120 | 4.71 | 565 |
| Sample 15 | $LiNi_{0.3}Co_{0.4}Ti_{0.15}Mn_{1.15}O_4$ | 127 | 4.74 | 602 |
| Sample 16 | $LiNi_{0.4}Fe_{0.2}Mn_{1.4}O_4$ | 126 | 4.68 | 589 |
| Sample 17 | $LiNi_{0.4}Fe_{0.2}Ti_{0.15}Mn_{1.25}O_4$ | 130 | 4.70 | 611 |
| Sample 18 | $LiNi_{0.4}Cr_{0.2}Mn_{1.4}O_4$ | 123 | 4.67 | 574 |
| Sample 19 | $LiNi_{0.4}Cr_{0.2}Si_{0.05}Mn_{1.35}O_4$ | 129 | 4.67 | 602 |
| Sample 20 | $LiNi_{0.45}Cu_{0.05}Mn_{1.5}O_4$ | 125 | 4.57 | 571 |
| Sample 21 | $LiNi_{0.45}Cr_{0.05}Si_{0.05}Mn_{1.45}O_4$ | 125 | 4.57 | 594 |

EXAMPLE 2

The cycle characteristic was evaluated using the positive electrodes obtained in Example 1. Materials for positive electrodes were prepared in the same method as used in Example 1 by using $LiNi_{0.5}Mn_{1.5}O_4$ (sample 1), $LiNi_{0.5}Mn_{1.4}Ti_{0.1}O_4$ (sample 3), $LiNi_{0.5}Mn_{1.35}Ti_{0.15}O_4$ (sample 4), $LiNi_{0.5}Mn_{1.3}Ti_{0.2}O_4$ (sample 5) and $LiNi_{0.5}Mn_{1.3}Si_{0.2}O_4$ (sample 7) for the positive active materials. Graphite was used for the negative active materials, which were mixed with carbon as the conductivity giving agent and were then dispersed in N-methyl pyrolidone, with polyvinylidene fluoride dissolved therein, in the form of a slurry. The weight ratios of the negative active material, the conductivity giving agent and the binder were 90/1/9. The slurry was coated on the Cu collector, after which the resultant structure was dried in vacuum for twelve hours to yield the electrode material. The electrode material was cut out into a disc of 13 mm in diameter. Thereafter, the electrode material was pressure-molded under pressure of 1.5 t/cm².

With a PP film used as the separator, the positive electrode and the negative electrode were so arranged to face each other and are placed in a coin cell which was filled with an electrolytic solution and sealed airtight to prepare a battery. The electrolytic solution in use was 1 mol/liter of an electrolyte $LiPF_6$ dissolved in a solvent EC (ethylene carbonate)/DEC (diethyl carbonate)=3/7 (vol-%).

The evaluation of the battery characteristics was conducted while charging was performed up to 4.75 V at a charge rate of 1C after which charging was performed at a steady voltage of 4.75 V. The total charge time was 150 minutes. Then, discharging was carried out up to 3 V at a rage of 1C. The above process was repeated and the capacity after 300 cycles was evaluated. Table 2 below shows the evaluation results.

It was confirmed that the use of a positive active material with Ti substitution and Si substitution increased the ratio of the capacity maintenance after 300 cycles.

TABLE 2

| Samples | Composition formulae | Capacity maintenance ratio after 300 cycles |
|---|---|---|
| Sample 1 | $LiNi_{0.5}Mn_{1.5}O_4$ | 55% |
| Sample 3 | $LiNi_{0.5}Mn_{1.4}Ti_{0.1}O_4$ | 60% |
| Sample 4 | $LiNi_{0.5}Mn_{1.35}Ti_{0.15}O_4$ | 70% |
| Sample 5 | $LiNi_{0.5}Mn_{1.3}Ti_{0.2}O_4$ | 75% |
| Sample 7 | $LiNi_{0.5}Mn_{1.3}Si_{0.2}O_4$ | 65% |

As described above, the present invention provides a positive material which, unlike the prior art, has a high capacity and high energy density. Specifically, the present invention provides the positive material for a lithium-ion based secondary battery, which has a high capacity and a high energy density with a high voltage of 4.5 V or higher with respect to Li.

What is claimed is:

1. A positive electrode active material for a secondary battery comprising:

a spinel lithium manganese composite oxide expressed by a general formula of $Li_a(M_xMn_{2-x-y}A_y)O_4$;

wherein x and y are positive values which satisfy 0.4<x, 0<y, x+y<2, and 0<a<1.2, wherein the ratio of A has a value of 0.1<y if A includes only Ti, wherein M denotes at least one metal element including Ni and A denotes at least one metal element selected from the group consisting of Si and Ti; and wherein Mn is essentially tetravalent.

2. The positive electrode active material according to claim 1, wherein said M denotes Ni and at least one metal element selected from the group consisting of Co, Fe, Cr and Cu.

3. The positive electrode active material according to claim 1, wherein said M is Ni.

4. The positive electrode active material according to claim 3, wherein said A is Si.

5. The positive electrode active material according to claim 3, wherein said A is Ti.

6. The positive electrode active material according to claim 3, wherein said A is Si and Ti.

7. The positive electrode active material according to claim 1, wherein said A is Si.

8. The positive electrode active material according to claim 1, wherein said A is Ti.

9. The positive electrode active material according to claim 1, wherein said A is Si and Ti.

10. The positive electrode active material according to claim 1, wherein said positive active material is acquired by baking a mixture of one Li raw material selected from the group consisting of $Li_2CO_3$, LiOH, $Li_2O$ and $Li_2SO_4$ and a raw material of a composite oxide of metal other than Li.

11. The positive electrode active material according to claim 1, wherein said ratio x of M lies in a range of 0.4<x<0.6.

12. The positive electrode active material according to claim 1, wherein a mean discharge voltage with respect to a lithium reference potential is equal to or higher than 4.5 V.

13. A positive electrode for a secondary battery, comprising a positive electrode active material for a secondary battery as recited in claim 1, the positive electrode active material being bound by a binder.

14. A secondary battery comprising:
   a positive electrode for a secondary battery as recited in claim 13;
   a negative electrode; and
   a separator which is sandwiched between said positive electrode and said negative electrode so as to oppose them each other.

* * * * *